United States Patent
Bray

(10) Patent No.: US 12,264,015 B1
(45) Date of Patent: Apr. 1, 2025

(54) STRUCTURAL RIB ASSEMBLIES FOR CONTAINER SHUTTLE RAILS

(71) Applicant: Amazon Technologies, Inc., Seattle, WA (US)

(72) Inventor: Michael Alan Bray, Elkhorn, NE (US)

(73) Assignee: Amazon Technologies, Inc., Seattle, WA (US)

( * ) Notice: Subject to any disclaimer, the term of this patent is extended or adjusted under 35 U.S.C. 154(b) by 979 days.

(21) Appl. No.: 17/333,692

(22) Filed: May 28, 2021

(51) Int. Cl.
  *B65G 21/02* (2006.01)
  *B65G 54/02* (2006.01)
  *B61B 10/00* (2006.01)

(52) U.S. Cl.
  CPC ............. *B65G 21/02* (2013.01); *B65G 54/02* (2013.01); *B61B 10/001* (2013.01)

(58) Field of Classification Search
  CPC .......... B61B 10/001; B61B 5/00; B61B 5/02; B65G 21/02; B65G 54/02; B65G 21/00; B65G 21/16; B65G 21/2045; B65G 21/2063; B65G 21/22; B65G 54/00; E01B 25/00; E01B 26/00; E01B 26/005; E01B 25/08
  USPC ................................. 104/290, 125, 124, 126
  See application file for complete search history.

(56) References Cited

U.S. PATENT DOCUMENTS

| | | | |
|---|---|---|---|
| 8,096,408 B2 * | 1/2012 | Deyanov ................ | B65G 35/06 29/760 |
| 9,617,078 B2 * | 4/2017 | Hall ........................ | B65G 21/02 |
| 10,035,652 B2 * | 7/2018 | Schnabl ............... | B65G 1/1378 |
| 2017/0327318 A1 * | 11/2017 | Chung .................... | B65G 21/22 |

FOREIGN PATENT DOCUMENTS

JP          H08324968 A    * 12/1996

* cited by examiner

*Primary Examiner* — Zachary L Kuhfuss
*Assistant Examiner* — Heaven R Buffington
(74) *Attorney, Agent, or Firm* — Eversheds Sutherland (US) LLP

(57) ABSTRACT

Systems and methods are disclosed for structural rib assemblies for container shuttle rails. In one embodiment, an example system for a shuttle may include a rib assembly. The rib assembly may include a first plate with a first tab on a first lateral side, a second tab on a second lateral side, a first cutout disposed adjacent to the first tab, a second cutout disposed adjacent to the second tab, and a third cutout disposed along an upper portion of the first plate. The rib assembly may include a second plate coupled to the first plate, the second plate having a third tab on a first lateral side, a fourth tab on a second lateral side, a fourth cutout disposed adjacent to the third tab, a fifth cutout disposed adjacent to the fourth tab, and a sixth cutout disposed along an upper portion of the second plate.

18 Claims, 9 Drawing Sheets

STRUCTURAL RIB ASSEMBLIES FOR CONTAINER SHUTTLE RAILS

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
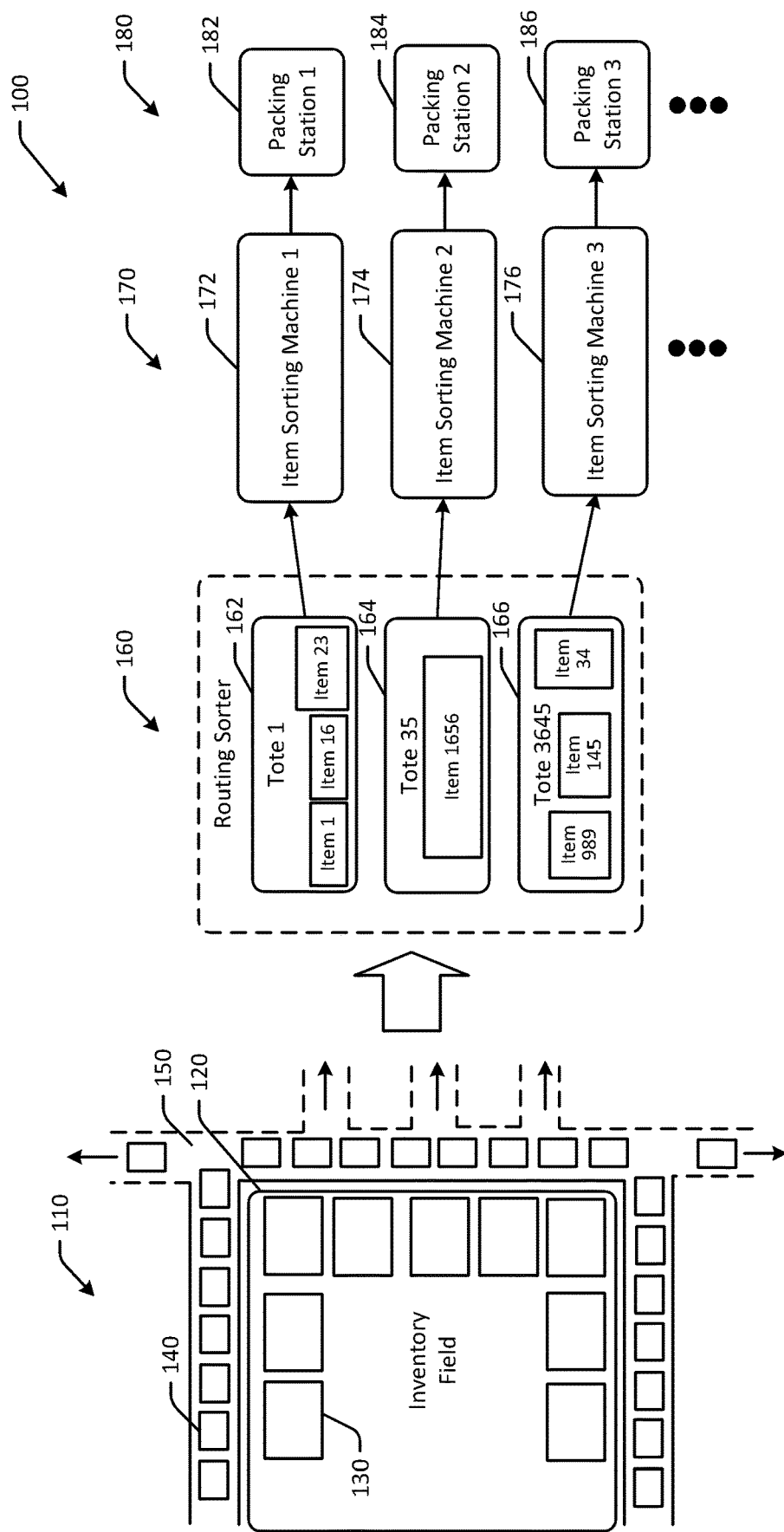
FIG. 1 is a hybrid schematic illustration of an example use case for structural rib assemblies for container shuttle rails in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. Movement of container shuttles along rails may be difficult in that the shuttle may have to execute a turn or may otherwise have to switch or shift from one set of rails to another. In addition, depending on the size, speed, weight, and other factors of shuttles, stresses imparted on a shuttle rail system may be large, resulting in increased maintenance requirements, failure points, potential for issues, and so forth. Accordingly, improving structural integrity of shuttle rail systems may be desired, so as to provide a robust system on which shuttles can move regardless of speed, size, weight, and/or other factors.

Structural support systems for shuttle rails may have tight tolerances, such as tolerances of less than 0.005 inches, which may be driven in part by low clearance space for magnet-driven shuttles. For instance, certain shuttles may include one or more magnets, such as permanent magnets, underneath the shuttle that interact with electromagnets disposed along a set of rails. The permanent magnet and electromagnets may work together to form a linear induction motor that propels the shuttle. However, the magnet coupled to the shuttle may extend below the upper edges of the rails on which the shuttle moves. Accordingly, structural supports for shuttle rails cannot interfere with magnets passing over the structural supports.

Embodiments of the disclosure include structural rib assemblies for container shuttle rails that provide durable strength and structural integrity improvements, while allowing for highly precise and repeatable positioning so as to avoid interference with other components of shuttle systems, such as magnets. Some embodiments provide consistent positioning to within 0.005 inches in a vertical direction via one or more alignment features. Embodiments include structural rib assemblies formed of stamped, folded, and/or laser cut sheet metal or other material, such as aluminum, steel, plastic, composite materials, and so forth. Some embodiments include two separate steel plates coupled together to form an I-beam style structural component that can be positioned laterally across a track section to increase axial and lateral rigidity of the tracks or shuttle rail system. Certain embodiments may prevent deflection of one or more tracks of a shuttle rail system during shuttle movement.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Embodiments of the disclosure include methods and systems for structural rib assemblies for container shuttle rails that may improve processing and fulfillment of orders. Certain embodiments provide scalable structural products that are low cost, highly accurate, easy to assemble, and easy to install. The structural rib assemblies described herein minimize cost, assembly time, and installation complexity. Embodiments provide resistance to the attractive force of a magnet array of a shuttle, as well as a linear motor of the shuttle (e.g., along a vertical or z-axis, etc.). The structural rib assemblies may include two or more separated plates, which may resist or provide rigidity for acceleration forces in the direction of travel (e.g., along an x-axis, etc.). Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for structural rib assemblies for container shuttle rails is depicted in accordance with one or more embodiments of the disclosure. Although discussed in the context of online orders, other embodiments may be directed to any suitable use case where containers are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include shuttle rails that may be used to guide shuttles from one location to another. The rails may have structural rib assemblies that provide structural rigidity for container shuttle rails that allow for shuttles to move along the set of rails.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

Embodiments of the disclosure include systems and methods for structural rib assemblies for container shuttle rails. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive. One or more illustrative embodiments of the disclosure have been described above.

The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
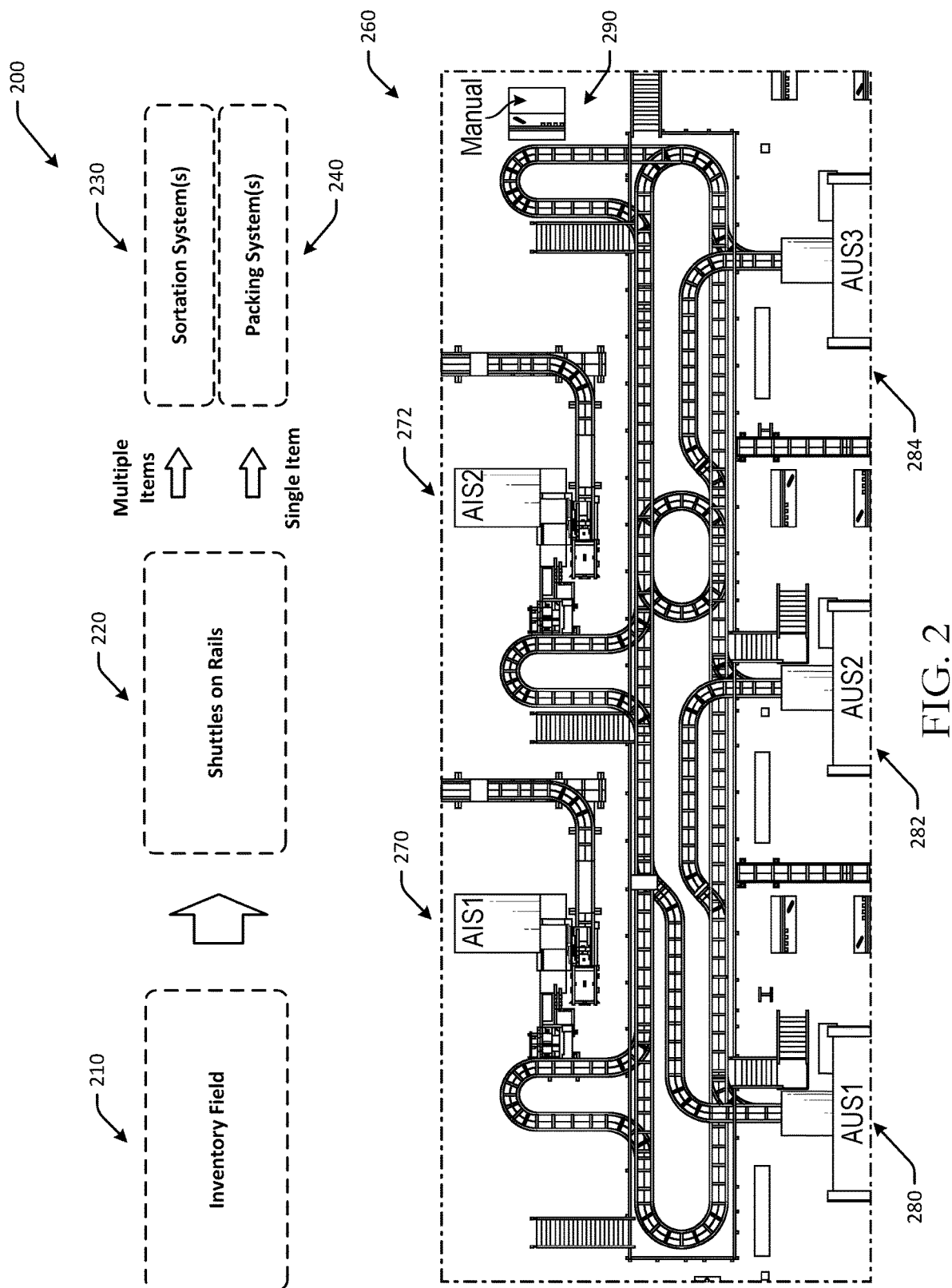
FIG. 2 is a schematic illustration of an example use case and facility layout for structural rib assemblies for container shuttle rails in accordance with one or more embodiments of the disclosure.

FIG. 2 is a schematic illustration of an example use case 200 and facility layout for structural rib assemblies for container shuttle rails in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more containers and the containers may be transported using one or more shuttles, such as one or more shuttles on rails 220. The shuttles on rails 220 may include container shuttles that are configured to transport items and/or containers from one location to another via rails. The rails may include structural rib assemblies to improve structural integrity and resist deflection and/or other forces resulting from shuttle movement on the rails. Some rails may include retractable rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. The rail system 260 may include rails that link various systems, such as sortation systems, to each other and/or to other systems, such as container handling systems, manual induction systems 290, and so forth. For example, the rail system 290 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
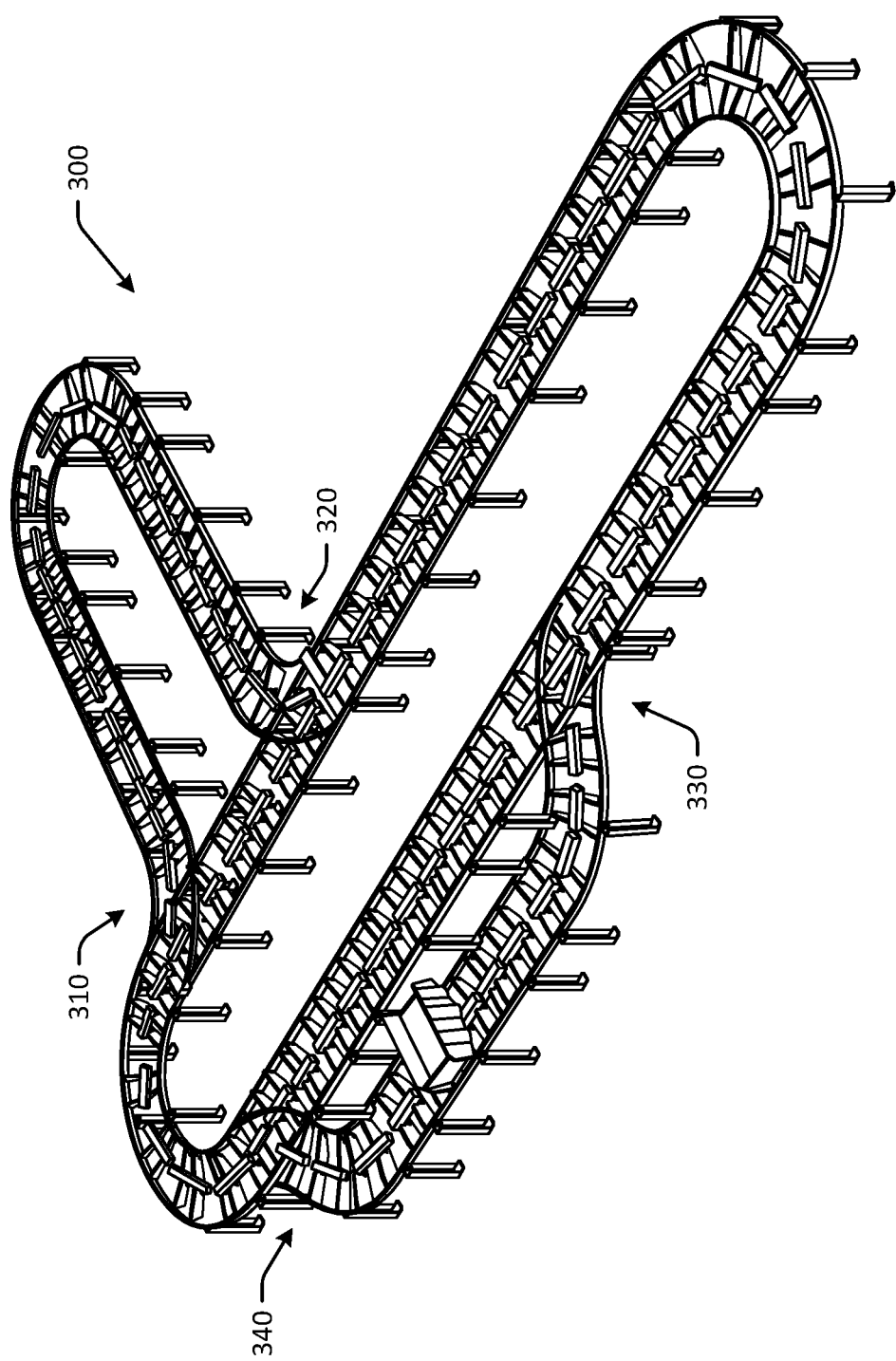
FIG. 3 is a schematic illustration of a perspective view of a shuttle rail system in accordance with one or more embodiments of the disclosure.

FIG. 3 is a schematic illustration of a perspective view of a shuttle rail system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may include the same structural rib assemblies for container shuttle rails discussed with respect to FIGS. 1-2, and/or may be used with any of the systems described herein.

The shuttle rail system 300 may be configured to provide continuous rail for switching the direction of a shuttle in an electromagnetically propelled shuttle-on-rail arrangement. Shuttle-on-rail arrangements may be used in many systems, such as sortation systems, pick systems, delivery systems, etc. The shuttle rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance. For motion along a uniform non-branching path, the gap may be easy to maintain using the structural rib assemblies described herein. However, when a path created by the rails has multiple branches (e.g., emanating, merging, etc.) the rail from one path intersects the electromagnets of another path. For example, the shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340.

At any of the branched paths, the shuttle may move from one set of rails to another set of rails. During this transfer, one or more optional retractable rail components may be used to provide clearance for the magnet disposed under the shuttle to move between sets of rails without impacting any of the rails.

Figure 4A:
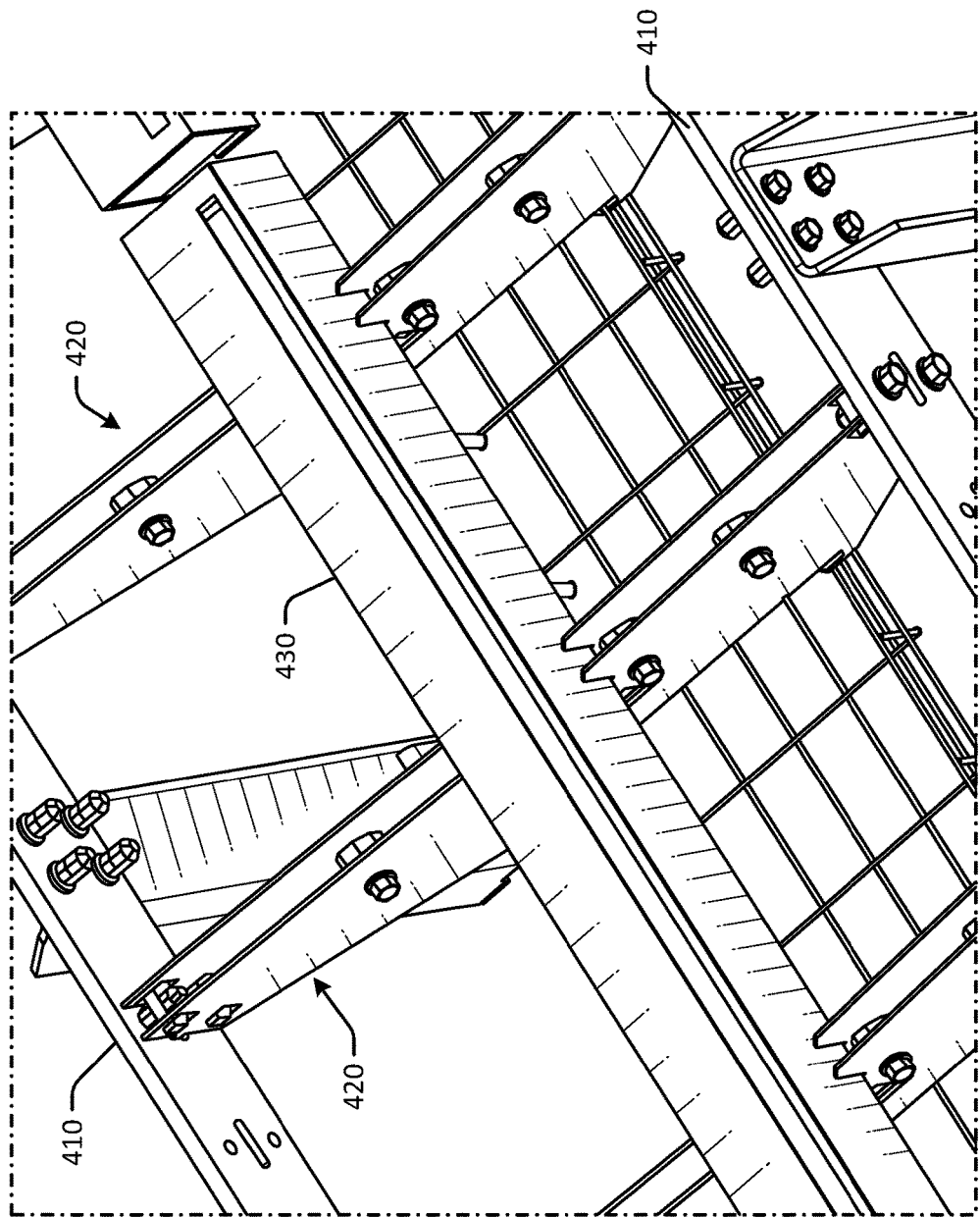
FIGS. 4A-4B are schematic illustrations of various views of portions of a shuttle rail system with structural rib assemblies in accordance with one or more example embodiments of the disclosure.
Figure 4B:
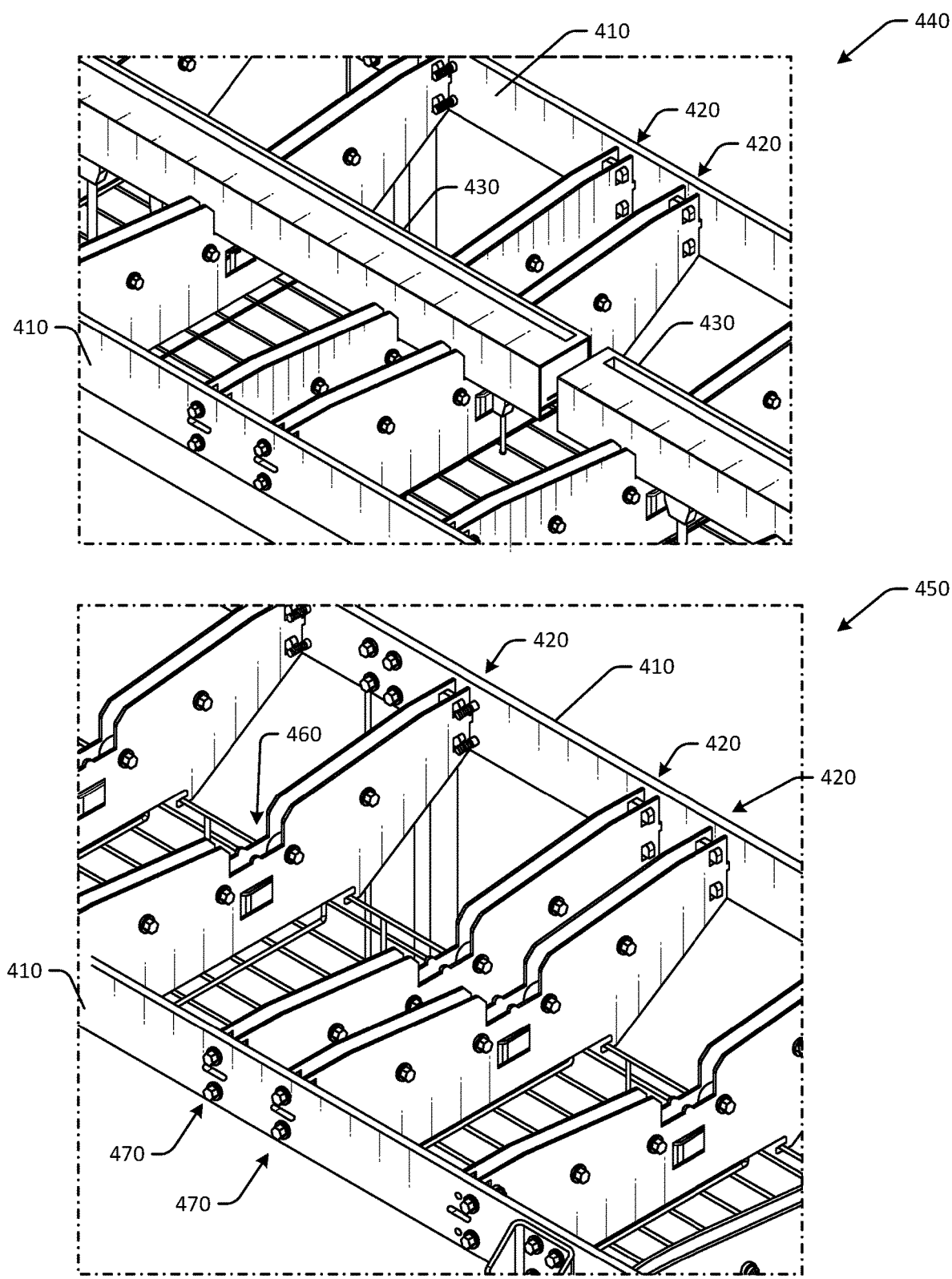

FIGS. 4A-4B are schematic illustrations of various views of portions of a shuttle rail system with structural rib assemblies in accordance with one or more example embodiments of the disclosure. Other embodiments may include additional or fewer components. The illustration of FIGS. 4A-4B are not to scale, and may not be illustrated to scale with respect to other figures. The system illustrated in FIGS. 4A-4B may include the same structural rib assemblies discussed with respect to FIGS. 1-3.

In FIG. 4A, a portion of a shuttle rail system 400 is depicted in perspective view. Shuttles may move along the shuttle rail system 400 to transport containers or other objects from one location to another. The shuttle rail system 400 may include one or more sets of rails 410 on which shuttles may ride. The set of rails 410 that form a track on which a shuttle can move. The set of rails 410 may include linear and/or curved segments. The rails may guide shuttles to various locations. Each set of rails may include two rails, so as to support two sides of a shuttle on the rails. A number of electromagnets 430 may optionally be disposed along the rails at various intervals. The electromagnets 430 may be used to propel shuttles that have permanent magnets disposed thereon. Any number of electromagnets 430 may be disposed along the shuttle rail system 400. The electromagnets 430 may be configured to propel shuttles along the respective sets of rails.

A number of structural rib assemblies 420 may be disposed laterally across the track formed by the set of rails 410. The structural rib assemblies 420 may be secured to each of the rails on both sides of the track. The structural rib assemblies 420 may provide structural rigidity for the set of rails 410 and may resist deflection in lateral directions, and may further resist vertical forces as a result of magnetic interaction between magnets on shuttles and the linear induction motors 430. The structural rib assemblies 420 are discussed in detail with respect to FIGS. 5A-5C.

In FIG. 4B, the shuttle rail system 400 is depicted with the electromagnets 430 in perspective view 440, and without the electromagnets 430 in perspective view 450. The structural rib assemblies 420 may be used to support the electromagnets 430 of the shuttle rail system 400. The structural rib assemblies 420 may include alignment features 460, such as tabs, that engage with corresponding features, such as a slot, on the electromagnets 430, so as to ensure consistent lateral positioning of the electromagnets 430 throughout the shuttle rail system 400.

The structural rib assemblies 420 may be arranged at the same or at different spacing along the set of rails 410. For example, two structural rib assemblies 420 may be disposed adjacent to each other at certain points along the set of rails 410 as needed to improve structural integrity. In other sections, single structural rib assemblies 420 may be used. The structural rib assemblies 420 may be secured to each rail 410 using hardware, such as bolts 470. The structural rib assemblies 420 may be coupled to the rails 410 at consistent vertical heights as a result of an alignment tab on the structural rib assemblies 420 that engages with a slot on the rails 410. The combination of slots and tabs may ensure that the structural rib assemblies 420 are disposed at the same vertical elevation (or height with respect to a ground surface), which may be critical for optimal operation of electromagnetically propelled shuttles.

The shuttle rail system 400 may therefore include a track comprising a first rail segment 410 and a second rail segment 410. The shuttle rail system 400 may include a shuttle configured to transport individual items from a first location to a second location using the track, along with a linear motor (e.g., electromagnet 430) disposed between the first rail segment 410 and the second rail segment 410. The linear motor or electromagnet 430 may have a housing that includes a slot disposed on a lower surface. The slot may engage the alignment feature 460 of the structural rib assemblies 420.

The shuttle rail system 400 may include a rib assembly, such as the structural rib assembly 420, disposed between the first rail segment 410 and the second rail segment 410. The rib assembly may include a first plate having a first tab on a first lateral side, and a second tab on a second lateral side. The first tab and the second tab may engage with respective slots on the first rail segment 410 and the second rail segment 410 for vertical elevation alignment. The structural rib assembly 420 may include a first cutout disposed adjacent to the first tab, and a second cutout disposed adjacent to the second tab. The first cutout and the second cutout may be used to receive or otherwise engage a unistrut nut or other hardware component to facilitate coupling between the structural rib assemblies 420 and the rail segment. The first plate of the structural rib assembly 420 may include a third cutout disposed along an upper portion of the first plate that is configured to receive the electromagnet 430. The structural rib assembly 420 may include a second plate coupled to the first plate, where the second plate includes a third tab on a first lateral side, and a fourth tab on a second lateral side. The second plate of the structural rib assembly 420 may include a fourth cutout disposed adjacent to the third tab, a fifth cutout disposed adjacent to the fourth tab, and a sixth cutout disposed along an upper portion of the second plate. The structural rib assembly 420 may include a set of spacers configured to separate the first plate from the second plate.

The first rail segment 410 may include a first aperture, a second aperture, and a first slot disposed between the first aperture and the second aperture. The structural rib assembly 420 may be coupled to the first rail segment via bolts that engage the unistrut nuts of the structural rib assembly 420 through the first aperture and the second aperture, where the alignment tabs of the first plate and the second plate of the structural rib assembly 420 engage the first slot of the first rail segment.

The second rail segment 410 may similarly include a third aperture, a fourth aperture, and a second slot disposed between the third aperture and the fourth aperture. The structural rib assembly 420 may be coupled to the second rail segment via bolts that engage the unistrut nuts of the structural rib assembly 420 through the third aperture and the fourth aperture, where the alignment tabs of the first plate and the second plate of the structural rib assembly 420 engage the second slot of the second rail segment.

Figure 5A:
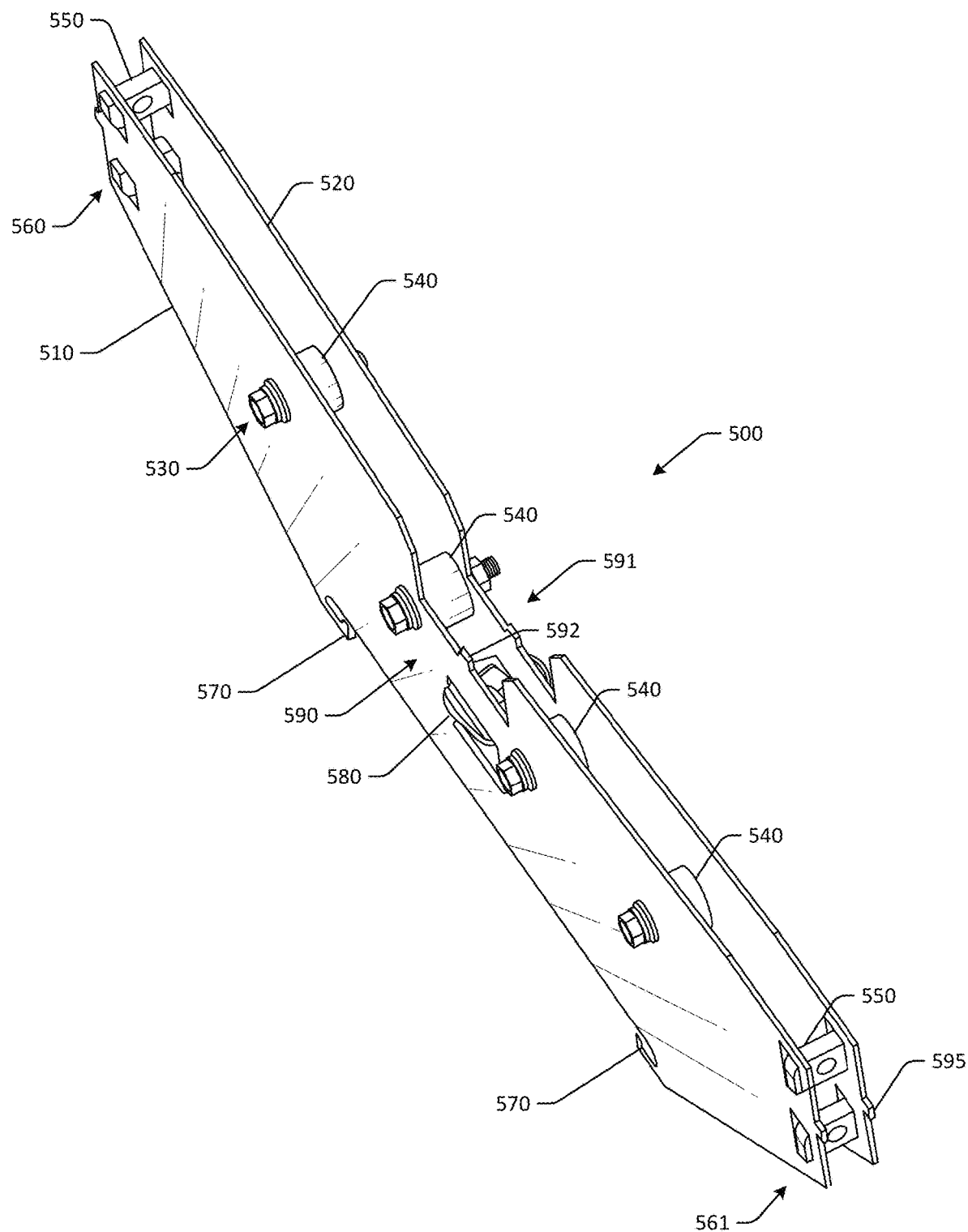
FIGS. 5A-5C are schematic illustrations of various views of a structural rib assembly in accordance with one or more embodiments of the disclosure.
Figure 5B:
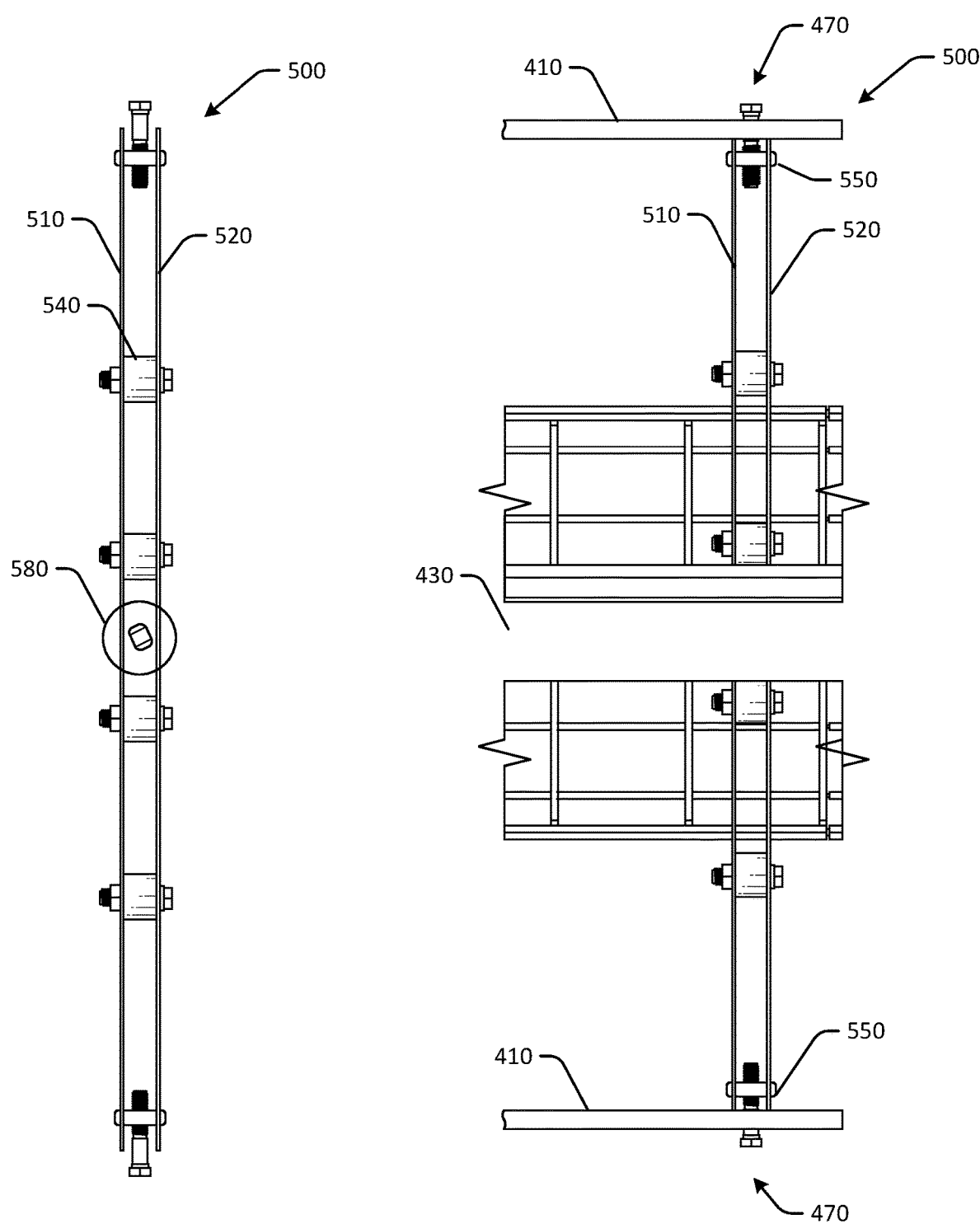
Figure 5C:
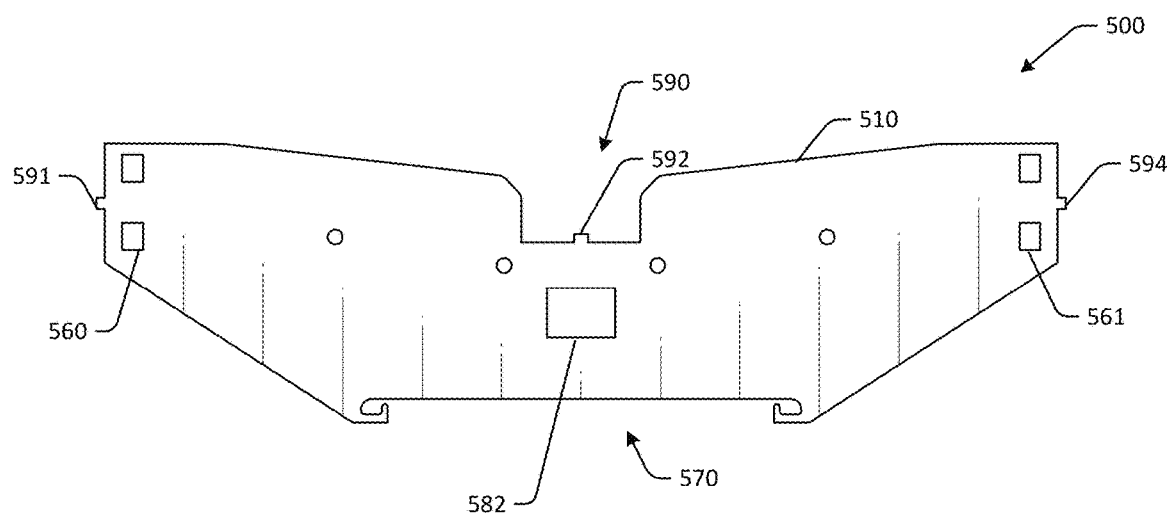
Figure 5C:
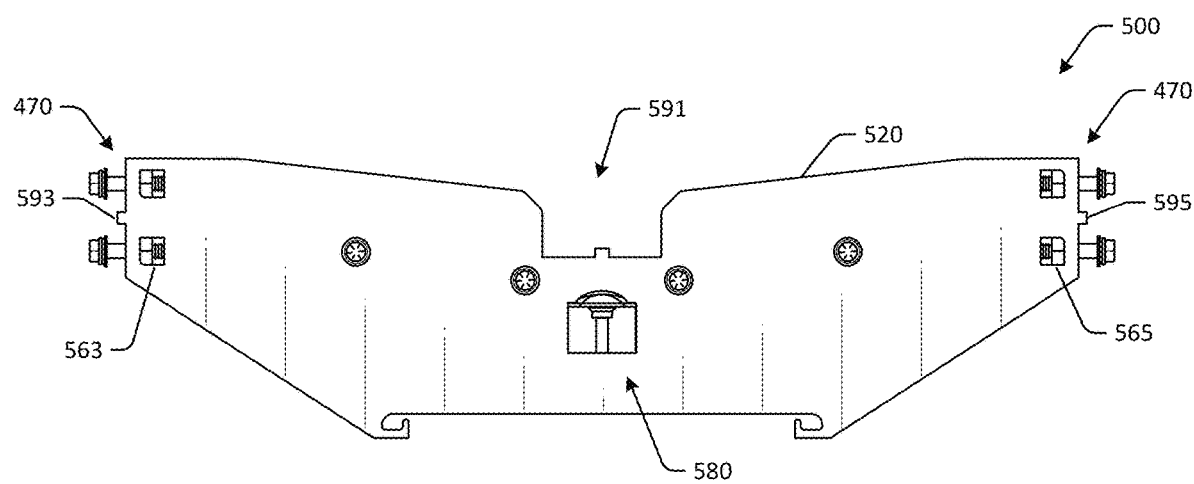

FIGS. 5A-5C are schematic illustrations of various views of a structural rib assembly 500 in accordance with one or more embodiments of the disclosure. Other embodiments may include additional or fewer components. The illustration of FIGS. 5A-5C are not to scale, and may not be illustrated to scale with respect to other figures. The structural rib assembly illustrated in FIGS. 5A-5C may be the same structural rib assemblies discussed with respect to FIGS. 1-4B.

The structural rib assembly 500 may be used to support any pair or set of rails that form a track, such as the shuttle rail systems described herein. The structural rib assembly 500 may include a first plate 510 and a second plate 520. In some embodiments, the first plate 510 and the second plate 520 may be non-aluminum metal plates, such as steel plates, so as to reduce costs. The first plate 510 and the second plate 520 may be formed of a non-magnetic material.

The first plate 510 and the second plate 520 may be coupled in an I-beam formation. The first plate 510 and the second plate 520 may be coupled by any suitable coupling components, such as one or more bolts 530. For example, a set of coupling components, such as the bolts 530, may be configured to couple the first plate 510 to the second plate 520. The set of coupling components may be removably positioned in apertures formed in respective spacers of the set of spacers 540.

The structural rib assembly 500 may include one or more spacers 540 that separate the first plate 510 from the second plate 520. The bolts 530 may pass through respective spacers 540. Any number of bolts 530 and/or spacers 540 may be used. The set of spacers 540 may be configured to separate the first plate 510 from the second plate 520.

The first plate 510 may include a first tab 591 on a first lateral side, and a second tab 594 on a second lateral side. The first plate 510 may include a first cutout 560 disposed adjacent to the first tab, and a second cutout 561 disposed adjacent to the second tab. The first cutout 560 and the second cutout 561 may be used to receive a portion of a member, such as a unistrut nut 550 or other hardware, that is also engaged with a corresponding cutout on the second plate 520. Accordingly, the members or unistrut nuts 550 may extend between the first plate 510 and the second plate 520. Any number of members or unistrut nuts 550 may be used with corresponding cutouts. For example, in the depicted embodiment of FIG. 5A, the first plate 510 and the second plate 520 may include two cutouts disposed on both lateral sides of the respective plates, which may be used for a total of four unistrut nuts 550 to be disposed between the respective plates.

The first plate 510 may include a third cutout 590 that is disposed along an upper portion of the first plate 510. The third cutout 590 may be configured to receive a housing of an electromagnet 430. In some embodiments, the first plate 510 may include an alignment tab 592 or other alignment feature (e.g., groove, etc.) that positively positions the electromagnet 430 with respect to the first plate 510. The alignment tab 592 may extend from the upper portion of the first plate 510 along the third cutout 590.

The second plate 520 may include a third tab 593 on a first lateral side, and a fourth tab 595 on a second lateral side. The second plate 520 may include a fourth cutout 563 disposed adjacent to the third tab, and a fifth cutout 565 disposed adjacent to the fourth tab. The fourth cutout 563 and the fifth cutout 565 may be used to receive a portion of a unistrut nut 550 or other hardware that is also engaged with a corresponding cutout on the first plate 510. Accordingly, the unistrut nuts 550 may extend between the first plate 510 and the second plate 520. The second plate 520 may include a sixth cutout 591 that is disposed along an upper portion of the second plate 520. The sixth cutout 591 may be configured to receive a housing of an electromagnet 430. In some embodiments, the second plate 520 may include an alignment tab 592 or other alignment feature (e.g., groove, etc.) that positively positions the electromagnet 430 with respect to the second plate 520. The alignment tab 592 may extend from the upper portion of the second plate 520 along the sixth cutout 591.

The first plate 510 and the second plate 520 may include a number of hooks 570, such as a first hook disposed along a lower portion of the first plate 510, and a second hook disposed along the lower portion of the first plate 510. The hooks 570 may be used to support wires or other hardware. For example, the shuttle rail system 400 may include a wire basket or a wire trough coupled to the first hook and the second hook. Wires may be routed along the track(s) using one or more wire baskets or wire troughs.

The structural rib assembly 500 may include a nut 580 (which may optionally be coupled to a washer) and a bolt that is configured to engage both the nut 580 and a linear motor 430, so as to secure the linear motor 430 to the structural rib assembly 500. For example, a T-bolt may be used to engage a slot on a lower surface of the linear motor 430 and the nut 580. The structural rib assembly 500 may therefore provide support for electromagnets or linear motors 430.

In FIG. 5C, the structural rib assembly 500 is depicted in front and rear views. As depicted in FIG. 5C, the nut 580 may be disposed between a first slot 582 in the first plate 510, and a corresponding second slot in the second plate 520. The first slot 582 and the second slot may therefore define a nut receptacle configured to receive the nut 580 between the first plate 510 and the second plate 520.

In FIG. 5B, the structural rib assembly 500 is depicted in an isolated top view with bolts engaged in the members, which may be unistrut nuts 550, that is used to secure the structural rib assembly 500 to the rails. The structural rib assembly 500 is also depicted with the rails 410, where the structural rib assembly 500 is coupled to the rails using bolts 470 that engage the members or unistrut nuts 550 disposed between the first plate 510 and the second plate 520. As illustrated in FIG. 5B, the linear motor 530 may be disposed in the respective cutouts along the upper surfaces of the first plate 510 and the second plate 520. The linear motor 430 may be coupled to the structural rib assembly 400 and may be at least partially disposed in the third cutout and the sixth cutout. The fifth tab and the sixth tab of the structural rib assembly 500 may be configured to engage a slot in a housing of the linear motor.

The track formed by the set of rails 410 may include a first rail segment having a first slot and a second rail segment having a second slot. The first slot and the second slot may be at a same vertical position relative to lower edges of the respective first rail segment 410 and second rail segment 410. The first slot and the second slot may have the same height and/or width. The first rail segment may include a first aperture disposed on a first side of the first slot, and a second aperture disposed on a second side of the first slot. The first aperture and the second aperture may have a diameter equal to the height of the first slot in some embodiments. The bolts 470 may be configured to pass through the apertures of the first rail segment and the member to couple the rib assembly 500 to the track.

The structural rib assembly 500 may therefore provide durable strength and structural integrity improvements, while allowing for highly precise and repeatable positioning so as to avoid interference with other components of shuttle systems, such as magnets. The structural rib assembly 500 may provide consistent positioning to within 0.005 inches in a vertical direction via one or more alignment features. The structural rib assembly 500 may be formed of stamped, folded, and/or laser cut sheet metal or other material, such as aluminum, steel, plastic, composite materials, and so forth. The structural rib assembly 500 may increase axial and lateral rigidity of the tracks or shuttle rail system. The structural rib assembly 500 may prevent deflection of one or more tracks of a shuttle rail system during shuttle movement.

One or more operations of the methods, process flows, or use cases of FIGS. 1-5C may have been described above as being performed by a user device, or more specifically, by one or more program module(s), applications, or the like executing on a device. It should be appreciated, however, that any of the operations of the methods, process flows, or use cases of FIGS. 1-5C may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5C may be described in the context of the illustrative devices, it should be appreciated that such operations may be implemented in connection with numerous other device configurations.

The operations described and depicted in the illustrative methods, process flows, and use cases of FIGS. 1-5C may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
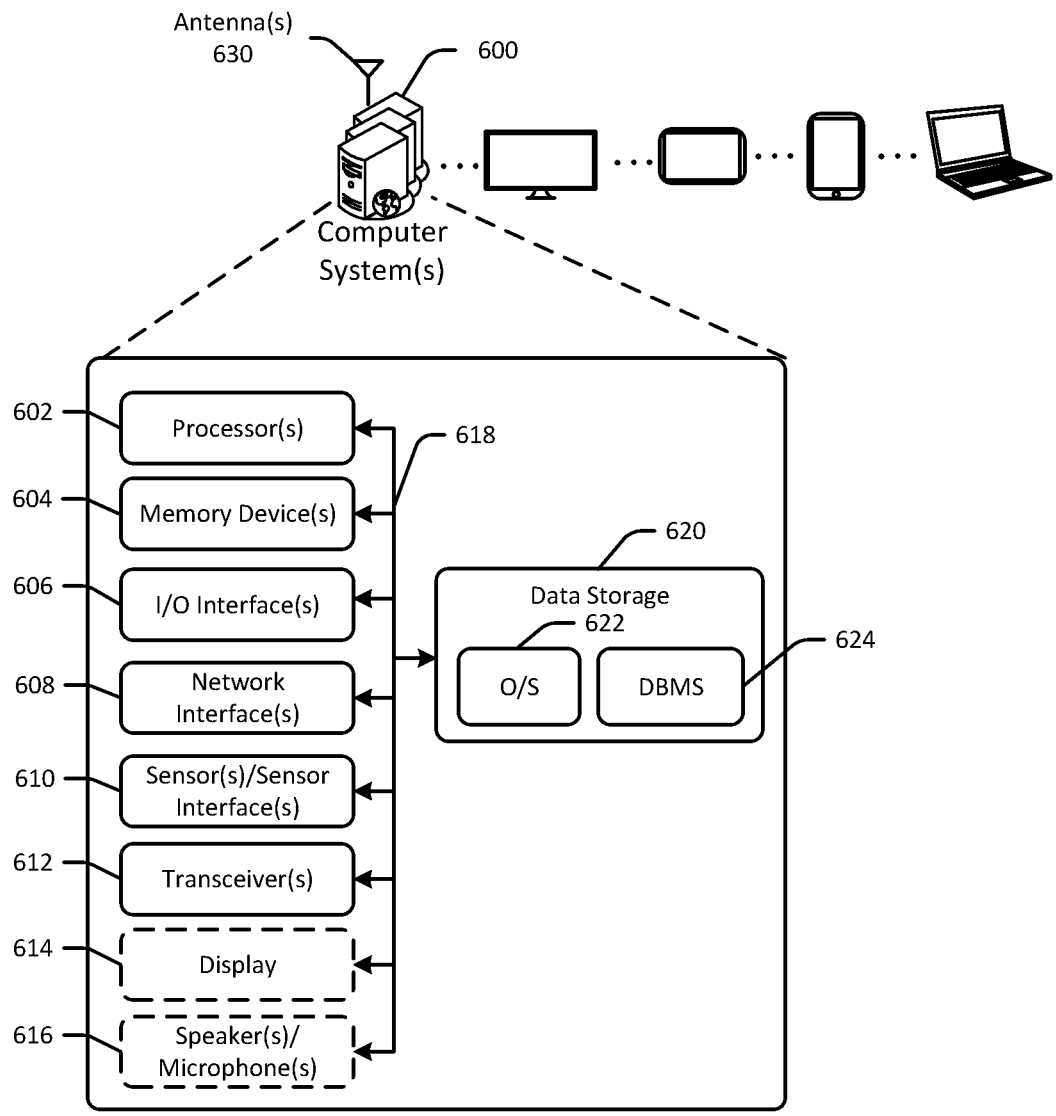
FIG. 6 schematically illustrates an example architecture of a computer system associated with a shuttle rail system in accordance with one or more embodiments of the disclosure.

FIG. 6 is a schematic block diagram of one or more illustrative computer system(s) 600 associated with a shuttle rail system in accordance with one or more example embodiments of the disclosure. The computer system(s) 600 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 600 may correspond to an illustrative device configuration for the controller(s) of the shuttle system discussed with reference to FIGS. 1-5C. For example, the computer system(s) 600 may be a controller and may control one or more aspects of the shuttle systems described in FIGS. 1-5C.

The computer system(s) 600 may be configured to communicate with one or more servers, user devices, or the like. The computer system(s) 600 may be configured to control rail switches, identify shuttles, direct shuttles, move shuttles, and so forth.

The computer system(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display(s) 614, one or more optional microphone(s) 616, and data storage 620. The computer system(s) 600 may further include one or more bus(es) 618 that functionally couple various components of the computer system(s) 600. The computer system(s) 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the computer system(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the computer system(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the computer system(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute the computer-executable instructions loaded therein. For example, the processor(s) 602 may be configured to execute the computer-executable instructions of the various program module(s), applications, engines, or the like of the computer system(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 620, the O/S 622 may be loaded from the data storage 620 into the memory 604 and may provide an interface between other application software executing on the computer system(s) 600 and the hardware resources of the computer system(s) 600. More specifically, the O/S 622 may include a set of computer-executable instructions for managing the hardware resources of the computer system(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 600 is a mobile device, the DBMS 624 may be any suitable lightweight DBMS optimized for performance on a mobile device.

Referring now to other illustrative components of the computer system(s) 600, the input/output (I/O) interface(s) 606 may facilitate the receipt of input information by the computer system(s) 600 from one or more I/O devices as well as the output of information from the computer system(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 600 may further include one or more network interface(s) 608 via which the computer system(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 630 may include any suitable type of antenna depending, for example, on the communications protocols used to transmit or receive signals via the antenna(s) 630. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 630 may be communicatively coupled to one or more transceivers 612 or radio components to which or from which signals may be transmitted or received.

As previously described, the antenna(s) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11 ad). In alternative example embodiments, the antenna(s) 630 may be configured to transmit or receive radio frequency signals within any suitable frequency range forming part of the unlicensed portion of the radio spectrum.

The antenna(s) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 630-transmitting or receiving radio frequency (RF) signals in the bandwidth and/or channels corresponding to the communications protocols utilized by the computer system(s) 600 to communicate with other devices. The transceiver(s) 612 may include hardware, software, and/or firmware for modulating, transmitting, or receiving—potentially in cooperation with any of antenna(s) 630-communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computer system(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 614 may be configured to output light and/or render content. The optional speaker(s)/microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computer system(s) 600 may include alternate and/or additional hardware, software, or firmware components beyond those described or depicted without departing from the scope of the disclosure. More particularly, it should be appreciated that software, firmware, or hardware components depicted as forming part of the computer system(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system for a shuttle, the system comprising:
   a rib assembly comprising:
      a first plate comprising a first tab on a first lateral side, a second tab on a second lateral side, a first cutout disposed adjacent to the first tab, a second cutout disposed adjacent to the second tab, and a third cutout disposed along an upper portion of the first plate;
      a second plate coupled to the first plate, the second plate comprising a third tab on a first lateral side, a fourth tab on a second lateral side, a fourth cutout disposed adjacent to the third tab, a fifth cutout disposed adjacent to the fourth tab, and a sixth cutout disposed along an upper portion of the second plate; and
      a set of spacers configured to separate the first plate from the second plate; and
   a track comprising a first rail segment having a first slot and a second rail segment having a second slot;
   wherein the first slot and the second slot are at a same vertical position relative to lower edges of the respective first rail segment and second rail segment, and wherein the first slot and the second slot have a first height.

2. The system of claim 1, wherein the rib assembly further comprises:
   a set of coupling components configured to couple the first plate to the second plate;
   wherein the set of coupling components are removably positioned in apertures formed in respective spacers of the set of spacers.

3. The system of claim 1, wherein the first plate further comprises a fifth tab extending from the upper portion along the third cutout, and the second plate further comprises a sixth tab extending from the upper portion along the sixth cutout.

4. The system of claim 3, further comprising:
   a linear motor coupled to the rib assembly and at least partially disposed in the third cutout and the sixth cutout;
   wherein the fifth tab and the sixth tab are configured to engage a slot in a housing of the linear motor.

5. The system of claim 4, further comprising:
   a nut; and
   a bolt configured to engage both the nut and the linear motor;
   wherein the first plate further comprises a first slot, and the second plate further comprises a second slot, wherein the first slot and the second slot define a nut receptacle configured to receive the nut between the first plate and the second plate.

6. The system of claim 1, wherein the first plate further comprises a first hook disposed along a lower portion of the first plate, and a second hook disposed along the lower portion of the first plate, the system further comprising:
   a wire trough coupled to the first hook and the second hook.

7. The system of claim 1, wherein the first plate and the second plate are non-aluminum metal plates.

8. The system of claim 1, wherein the first rail segment further comprises a first aperture disposed on a first side of the first slot, and a second aperture disposed on a second side of the first slot; and wherein the first aperture and the second aperture have a diameter equal to the first height.

9. The system of claim 8, wherein the rib assembly further comprises:
a member disposed in the first cutout of the first plate and the fourth cutout of the second plate.

10. The system of claim 9, further comprising:
a bolt configured to pass through the first aperture of the first rail segment and the member to couple the rib assembly to the track.

11. A rib assembly for use between a first rail segment and a second rail segment of a track, the rib assembly comprising:
a first plate comprising a first tab on a first lateral side, a second tab on a second lateral side, a first cutout disposed adjacent to the first tab, a second cutout disposed adjacent to the second tab, a ninth cutout adjacent to the first cutout, and a tenth cutout adjacent to the second cutout;
a second plate coupled to the first plate, the second plate comprising a third tab on a first lateral side, a fourth tab on a second lateral side, a fourth cutout disposed adjacent to the third tab, a fifth cutout disposed adjacent to the fourth tab, a seventh cutout adjacent to the fourth cutout, and an eighth cutout adjacent to the fifth cutout;
a set of spacers configured to separate the first plate from the second plate; and
a set of coupling components configured to couple the first plate to the second plate, wherein the set of coupling components are removably positioned in apertures formed in respective spacers of the set of spacers.

12. The rib assembly of claim 11, wherein the first plate further comprises a third cutout disposed along an upper portion of the first plate, and wherein the second plate further comprises a sixth cutout disposed along an upper portion of the second plate.

13. The rib assembly of claim 12, wherein the first plate further comprises a fifth tab extending from the upper portion along the third cutout, and the second plate further comprises a sixth tab extending from the upper portion along the sixth cutout.

14. The rib assembly of claim 11, wherein the first plate further comprises a first hook disposed along a lower portion of the first plate, and a second hook disposed along the lower portion of the first plate, the first hook and the second hook configured to receive a wire trough.

15. A system for a shuttle, the system comprising:
a rib assembly comprising:
a first plate comprising a first tab on a first lateral side, a second tab on a second lateral side, a first cutout disposed adjacent to the first tab, a second cutout disposed adjacent to the second tab, a third cutout disposed along an upper portion of the first plate, and a fifth tab extending from the upper portion along the third cutout;
a second plate coupled to the first plate, the second plate comprising a third tab on a first lateral side, a fourth tab on a second lateral side, a fourth cutout disposed adjacent to the third tab, a fifth cutout disposed adjacent to the fourth tab, a sixth cutout disposed along an upper portion of the second plate, and a sixth tab extending from the upper portion along the sixth cutout; and
a set of spacers configured to separate the first plate from the second plate; and
a linear motor coupled to the rib assembly and at least partially disposed in the third cutout and the sixth cutout;
wherein the fifth tab and the sixth tab are configured to engage a slot in a housing of the linear motor.

16. The system of claim 15, further comprising:
a nut; and
a bolt configured to engage both the nut and the linear motor;
wherein the first plate further comprises a first slot, and the second plate further comprises a second slot, wherein the first slot and the second slot define a nut receptacle configured to receive the nut between the first plate and the second plate.

17. The system of claim 15, wherein the rib assembly further comprises:
a set of coupling components configured to couple the first plate to the second plate;
wherein the set of coupling components are removably positioned in apertures formed in respective spacers of the set of spacers.

18. The system of claim 15, wherein the first plate further comprises a first hook disposed along a lower portion of the first plate, and a second hook disposed along the lower portion of the first plate, the system further comprising:
a wire trough coupled to the first hook and the second hook.

* * * * *